Figure 1:
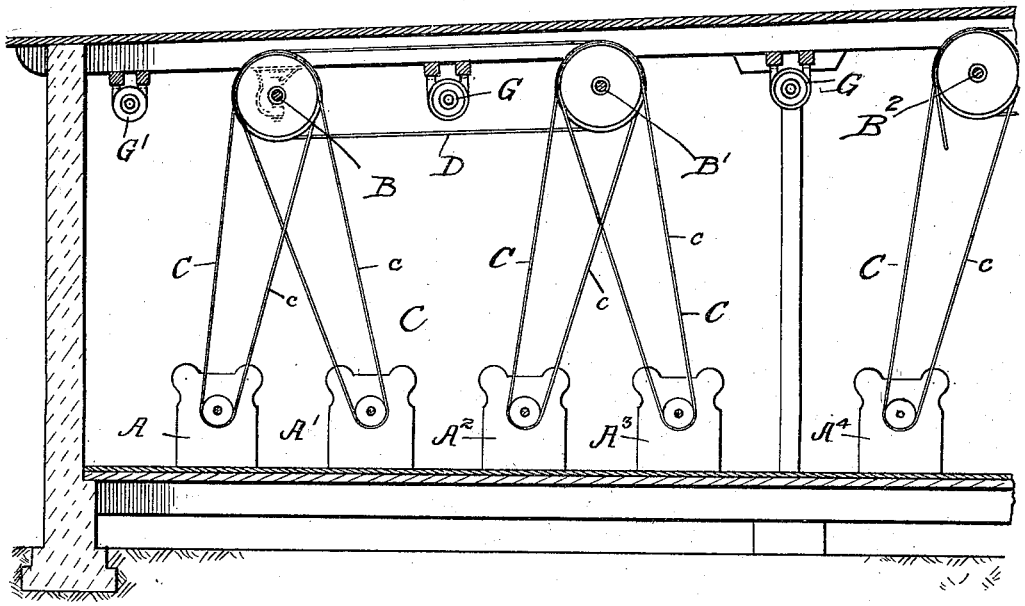

J. F. CANNON.
INTERCHANGEABLE DRIVING MECHANISM FOR COTTON MACHINERY.
APPLICATION FILED AUG. 8, 1914.

1,185,477.
Patented May 30, 1916.
2 SHEETS—SHEET 1.

WITNESSES
H. C. Barry
Myron G. Cleas.

INVENTOR
JOSEPH F. CANNON
BY Munn & Co
ATTORNEYS

J. F. CANNON.
INTERCHANGEABLE DRIVING MECHANISM FOR COTTON MACHINERY.
APPLICATION FILED AUG. 8, 1914.
1,185,477.
Patented May 30, 1916.
2 SHEETS—SHEET 2.
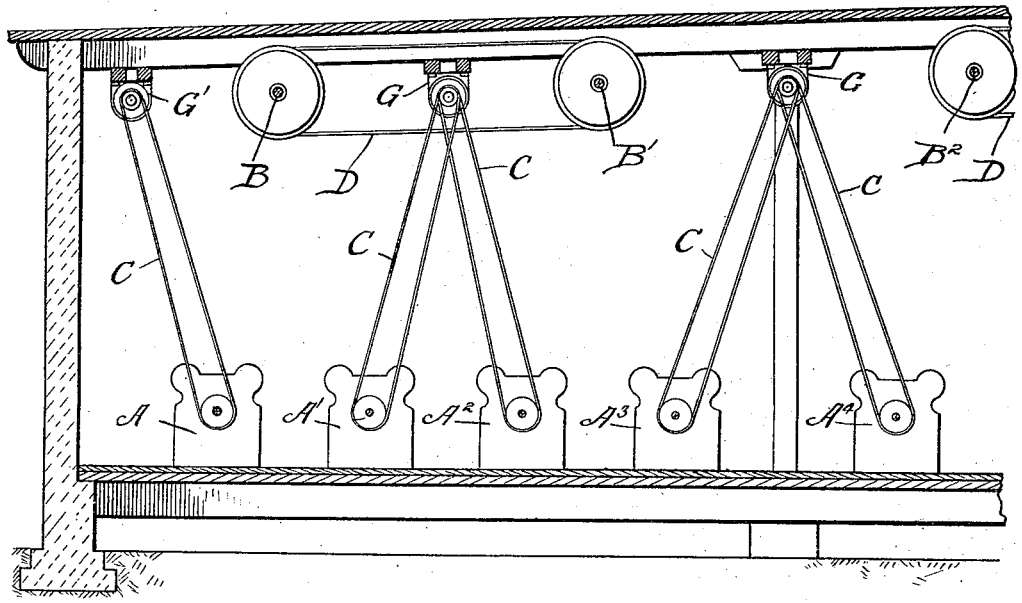
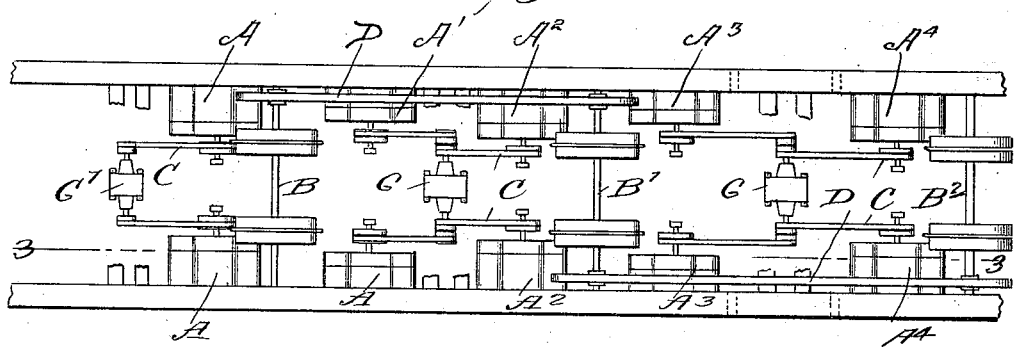
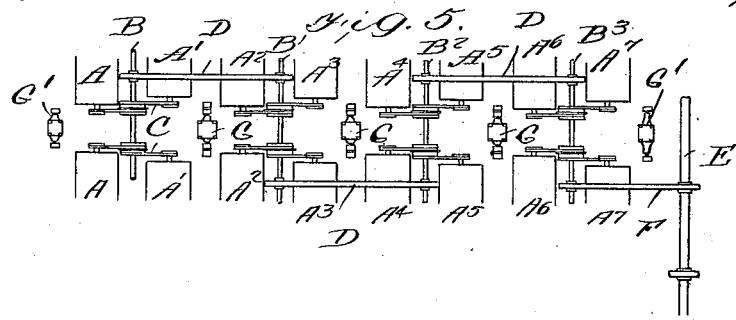
WITNESSES
F. C. Barry
Myron H. Clear
INVENTOR
JOSEPH F. CANNON
BY Munn & Co.
ATTORNEYS

UNITED STATES PATENT OFFICE.

JOSEPH FRANKLIN CANNON, OF CONCORD, NORTH CAROLINA.

INTERCHANGEABLE DRIVING MECHANISM FOR COTTON MACHINERY.

1,185,477. Specification of Letters Patent. Patented May 30, 1916.

Application filed August 8, 1914. Serial No. 855,834.

*To all whom it may concern:*

Be it known that I, JOSEPH F. CANNON, a citizen of the United States, and resident of Concord, in the county of Cabarrus and State of North Carolina, have invented an Improvement in Interchangeable Driving Mechanism for Cotton Machinery, of which the following is a specification.

My present invention relates generally to the driving mechanism for cotton machinery and more particularly to driving mechanism and driving connections for spinning frames and including both mechanically and electrically operative elements arranged in such relation to one another and to the spinning frames that the driving connections to the spinning frames may be shifted from the mechanical to the electrical elements and vice versa.

My primary object in providing an interchangeable driving mechanism of the type generally set forth above is to permit of a quick economical change from mechanical to electrical driving elements and from electric to mechanical, without the necessity of skilled mechanics to make the changes and without the necessity of special tools and implements to effect the changes.

In many of our cotton mills equipped in the first instance with mechanical means for driving spinning frames and other cotton machinery, it has been recently proposed to install electrically operated driving means following the comparatively recent installation of electrical power plants and in view of the material reduction in running expenses by the use of electric power. Inasmuch, however, as there are seasons when the electric power plants are unable to produce the necessary current, the cotton mills are forced at times to resort to mechanical driving means and hence in order to obviate shutting down the cotton machinery for any length of time it is essential that some simple means be provided whereby the shift from electrical to mechanical and vice versa may be accomplished in a quick, economical and effective manner.

Various means have been proposed for effecting such changes, many of which are entirely impracticable upon their faces and many others of which while entirely practicable, necessitate the employment of skilled mechanics over a considerable length of time during which the cotton machinery is at a stand still and the out-put undesirably curtailed.

The means which I propose and by which the above objects are carried out, are shown in the accompanying drawings, to which reference is made in the following description, said drawings forming a part of this specification and including certain figures, of which—

Figure 2:
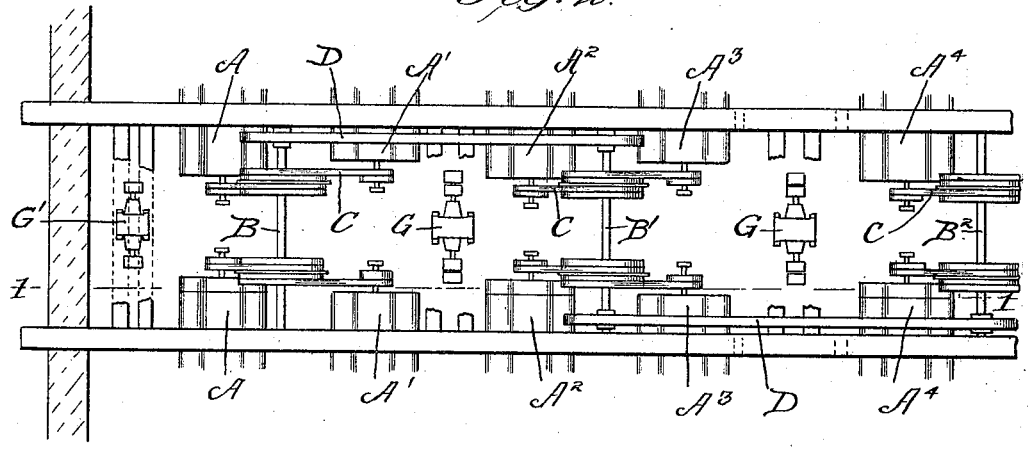

Figure 1 is a vertical section illustrating my invention in part, the driving connections being coupled with the mechanically operated driving elements, taken substantially on line 1—1 of Fig. 2. Fig. 2 is a plan view of the parts shown in Fig. 1. Fig. 3 is a view similar to Fig. 1, illustrating the driving connections coupled to the electrically operated driving elements and taken substantially on line 3—3 of Fig. 4. Fig. 4 is a plan view of the parts shown in Fig. 3, and Fig. 5 is a diagrammatic plan view illustrating a complete series of spinning frames and the application of my invention thereto.

Referring now to Fig. 5, the spinning frames are arranged in longitudinal series parallel with one another and including a plurality of opposing pairs of machines A to $A^7$ inclusive, and forming a plurality of sets of two pairs of machines to each set, the first set including pairs of machines A and $A'$, the second set including the pairs of machines $A^2$ and $A^3$, the third set including the machines $A^4$ and $A^5$ and the fourth set including the machines $A^6$ and $A^7$, although it is to be understood of course that greater numbers of sets may be formed where desirable so long as the arrangement is confined to sets of four machines to each set as just stated.

Above the several sets of machines thus arranged are disposed a plurality of transverse pulley shafts B, $B'$, $B^2$ and $B^3$, each of said pulley shafts being located above one of the sets of spinning frames and in a vertical plane between the opposing pairs of machines of the set as will be clearly seen in Fig. 5, each of the said pulley shafts being provided with four pulleys adapted for connection by belts C to the spinning frames of its particular set. Each of the pulley shafts B, B', B² and B³ is also provided with end pulleys whereby the several shafts may be connected by belts D for the purpose of transmitting power throughout the series of pulley shafts from the main driving shaft E which may be connected by a belt F to the pulley shaft at one end of the series, for instance the pulley shaft B³ as shown in Fig. 5.

The main driving shaft E may receive its rotation either directly or through any suitable intermediate connections, from any suitable source of power, and in using the term mechanically operated as applied to the several pulley shafts B³, I desire to be understood as including in the term all driving means other than those which utilize electrical current.

The electrically operated driving elements are in the form of a plurality of electric motors G arranged above the spinning frames and between the sets thereof above outlined, together with a pair of electric motors G' arranged substantially between the opposing pairs of machines A and A⁷ at the ends of the series. The electric motors G are of a capacity sufficient for the operation of four spinning frames each, and by their arrangement as specified and the fact that their shafts are provided with four pulleys, it is at once apparent that the several belts C extending to the spinning frames themselves may be shifted from the pulleys of the pulley shafts B to B³ inclusive, onto the pulleys of the motors G, the said belts being preferably provided with detachable sections c as shown in Fig. 1 for removal when shifting from the relatively large pulleys of the pulley shafts to the relatively small pulleys of the motors and to be reinserted when the shift is made from the motors to the pulley shafts.

In Figs. 1 and 2 I have shown a portion of the series of spinning frames and their electrical and mechanical driving elements, with the belts C connected to the pulleys of the pulley shafts B, B' and B² and consequently coupled to the mechanically operated driving means, while in Figs. 3 and 4, illustrating the same parts, I have shown the belts C shifted onto the pulleys of the motors after removal of their detachable sections c.

Thus by a comparison of Figs. 1 to 4 inclusive it will be seen that the motors G arranged between the sets of spinning frames are sufficient to take care of all the opposing pairs of machines upon opposite sides thereof, leaving the end pairs A and A⁷ of the spinning frames to be connected to the end motors G' as seen in Figs. 3 and 4, each of which motors may therefore be of smaller capacity than the several motors G, inasmuch as they each drive but a single pair of spinning frames.

Thus from the foregoing it will be seen that by the particular arrangement of the electrical motors and their adaptability to direct connections through the belts C to the several spinning frames, the full capacity of electrical power when such is at hand is utilized, none being dissipated through intermediate driving connections, pulley shafts and the like, such as is the case in the interchangeable systems before proposed and those now in use.

Furthermore it may be readily seen that to shift from mechanical to electrical power or vise versa it is simply necessary to remove the several belts C from the pulley shafts and engage the same upon the motor shafts or remove the same from the motor shafts and engage the same upon the pulley shafts, in the first operation the detachable sections c of the several pulleys being removed and in the second operation these detachable section being replaced. Each operation may be readily and quickly accomplished with little loss of time and therefore upon extremely short notice and may furthermore be accomplished without the necessity of skilled mechanics and the employment of special tools and implements for the purpose.

I claim:

1. An interchangeable driving mechanism comprising the combination with series of parallel opposing pairs of machines forming a plurality of sets of two pairs each, and mechanically driven power transmitting elements, each arranged between the pairs of machines of a set, of electrically operated driving elements disposed between the several sets of machines and between the opposing pairs of machines at the ends of the series thereof, and flexible driving connections connected to the machines and shiftable from the mechanically driven to the electrically driven elements, all for the purpose described.

2. An interchangeable driving mechanism comprising the combination with series of parallel opposing pairs of machines forming a plurality of sets of two pairs each, mechanically driven power transmission means common to the entire series and including a power transmitting element adjacent to each set and arranged between the pairs of machines thereof, and flexible driving connections between the machines of each set and the respective power transmitting element, of electrically operated driving elements disposed between the sets for independently driving the same, and at
5 the ends of the series, and onto which the said flexible driving connections are shiftable from the power transmitting elements, for the purpose described.

JOSEPH FRANKLIN CANNON.

Witnesses:
    ELI KENDRICK,
    R. W. AUSTIN.

Copies of this patent may be obtained for five cents each, by addressing the "Commissioner of Patents, Washington, D. C."